US007035368B2

(12) United States Patent
Pickering et al.

(10) Patent No.: US 7,035,368 B2
(45) Date of Patent: Apr. 25, 2006

(54) HIGH SPEED PARALLEL LINK RECEIVER

(75) Inventors: Andrew J. Pickering, Warks (GB); Giuseppe Surace, Northants (GB); Susan M. Simpson, Bucks (GB)

(73) Assignee: Texas Instruments Incorporated, Dallas, TX (US)

( * ) Notice: Subject to any disclaimer, the term of this patent is extended or adjusted under 35 U.S.C. 154(b) by 828 days.

(21) Appl. No.: 10/102,126

(22) Filed: Mar. 18, 2002

(65) Prior Publication Data

US 2003/0174798 A1    Sep. 18, 2003

(51) Int. Cl.
 *H03D 3/24*    (2006.01)
(52) U.S. Cl. ....................................... 375/376; 327/141
(58) Field of Classification Search ................ 375/376, 375/371, 359, 364, 374, 373; 713/600, 400, 713/502; 341/100; 327/150, 157, 156, 536, 327/537; 370/518
See application file for complete search history.

(56) References Cited

U.S. PATENT DOCUMENTS

| | | | |
|---|---|---|---|
| 5,341,405 A | | 8/1994 | Mallard, Jr. |
| 5,400,370 A | * | 3/1995 | Guo ............ 375/371 |
| 5,408,473 A | | 4/1995 | Hutchison et al. |
| 5,425,020 A | | 6/1995 | Gregg et al. |
| 5,488,641 A | * | 1/1996 | Ozkan ......... 375/374 |
| 5,777,567 A | * | 7/1998 | Murata et al. ........... 341/100 |
| 5,945,855 A | * | 8/1999 | Momtaz ...... 327/157 |
| 6,247,138 B1 | * | 6/2001 | Tamura et al. ........... 713/600 |
| 6,377,644 B1 | * | 4/2002 | Naudet ........ 375/371 |
| 2002/0090045 A1 | * | 7/2002 | Hendrickson ........... 375/376 |

FOREIGN PATENT DOCUMENTS

| | | |
|---|---|---|
| EP | 0 213 641 A2 | 3/1987 |
| EP | 0 533 091 A2 | 3/1993 |
| WO | WO 98/20655 | 5/1998 |

OTHER PUBLICATIONS

Clock Distribution in Synchronous Systems; Eby G. Friedman J. Webster (ed.), Wiley Encyclopedia of Electrical and Electronics Engineering Online Copyright © 1999 by John Wiley & Sons, Inc. All rights reserved.*

(Continued)

*Primary Examiner*—Jay K. Patel
*Assistant Examiner*—J. Meek
(74) *Attorney, Agent, or Firm*—Robert D. Marshall, Jr.; W. James Brady, III; Frederick J. Telecky, Jr.

(57) ABSTRACT

A digital system aligns a set of serial data receiver demultiplex circuits, thereby aligning the bits in the data words, while maintaining separate and optimally aligned data recovery clocks for each channel. The digital system generates a reference clock signal and one or more slave clock signals. Phase circuitry receives the slave clock signal and outputs a plurality of clock phase signals. A phase selection circuit receives the plurality of clock phase signals and selects an adjusted clock signal in response to a phase selection signal. A clock correlation circuit determines a phase difference between the reference clock signal and the adjusted clock signal and provides the phase selection signal to minimize the phase difference. The clock correlation circuit provides the phase selection signal from a counter.

14 Claims, 11 Drawing Sheets

OTHER PUBLICATIONS

A 6 Gbps CMOS phase detecting DEMUX module using half-frequency clock; Nakamura, K., et al; VLSI Circuits, 1998. Digest of Technical Papers. 1998 Symposium on Jun. 11-13, 1998 Page(s):196-197.*

SiGe clock and data recovery IC with linear-type PLL for 10-Gb/s SONET application Greshishchev, Y.M.; Schvan, P.; Solid-State Circuits, IEEE Journal of vol. 35, Issue 9, Sep. 2000 Page(s):1353-1359.*

* cited by examiner

| SDin | a0 | a1 | a2 | a3 | a4 | a5 | a6 | a7 | b0 | b1 | b2 | b3 | b4 | b5 | b6 | b7 | c0 | c1 | c2 | c3 | c4 | c5 | c6 | c7 |
|---|---|---|---|---|---|---|---|---|---|---|---|---|---|---|---|---|---|---|---|---|---|---|---|---|
| DRClk | | | | | | | | | | | | | | | | | | | | | | | | |
| DCP | a0 | | a2 | | a4 | | a6 | | b0 | | b2 | | b4 | | b6 | | c0 | | c2 | | c4 | | c6 | |
| DCN | | a1 | | a3 | | a5 | | a7 | | b1 | | b3 | | b5 | | b7 | | c1 | | c3 | | c5 | | |
| P0 | | a0 | | a2 | | a4 | | a6 | | b0 | | b2 | | b4 | | b6 | | c0 | | c2 | | c4 | | |
| P1 | | | a0 | | a2 | | a4 | | a6 | | b0 | | b2 | | b4 | | b6 | | c0 | | c2 | | c4 | |
| P2 | | | | a0 | | a2 | | a4 | | a6 | | b0 | | b2 | | b4 | | b6 | | c0 | | c2 | | |
| P3 | | | | | a0 | | a2 | | a4 | | a6 | | b0 | | b2 | | b4 | | b6 | | c0 | | c2 | |
| P4 | | | | | | a0 | | a2 | | a4 | | a6 | | b0 | | b2 | | b4 | | b6 | | c0 | | |
| P5 | | | | | | | a0 | | a2 | | a4 | | a6 | | b0 | | b2 | | b4 | | b6 | | c0 | |
| P6 | | | | | | | | a0 | | a2 | | a4 | | a6 | | b0 | | b2 | | b4 | | b6 | | |
| P7 | | | | | | | | | a0 | | a2 | | a4 | | a6 | | b0 | | b2 | | b4 | | b6 | |
| N0 | | | a1 | | a3 | | a5 | | a7 | | b1 | | b3 | | b5 | | b7 | | c1 | | c3 | | c5 | |
| N1 | | | | a1 | | a3 | | a5 | | a7 | | b1 | | b3 | | b5 | | b7 | | c1 | | c3 | | |
| N2 | | | | | a1 | | a3 | | a5 | | a7 | | b1 | | b3 | | b5 | | b7 | | c1 | | c3 | |
| N3 | | | | | | a1 | | a3 | | a5 | | a7 | | b1 | | b3 | | b5 | | b7 | | c1 | | |
| N4 | | | | | | | a1 | | a3 | | a5 | | a7 | | b1 | | b3 | | b5 | | b7 | | c1 | |
| N5 | | | | | | | | a1 | | a3 | | a5 | | a7 | | b1 | | b3 | | b5 | | b7 | | |
| N6 | | | | | | | | | a1 | | a3 | | a5 | | a7 | | b1 | | b3 | | b5 | | b7 | |
| N7 | | | | | | | | | | a1 | | a3 | | a5 | | a7 | | b1 | | b3 | | b5 | | |

MD[7:0] (OESel=0):

| | a0 | a2 | a4 | a6 | b0 | b2 | b4 | b6 | c0 | c2 | c4 |
| | a1 | a3 | a5 | a7 | b1 | b3 | b5 | b7 | c1 | c3 | |
| | | a0 | a2 | a4 | a6 | b0 | b2 | b4 | b6 | c0 | c2 |
| | | a1 | a3 | a5 | a7 | b1 | b3 | b5 | b7 | c1 | |
| | | | a0 | a2 | a4 | a6 | b0 | b2 | b4 | b6 | c0 |
| | | | a1 | a3 | a5 | a7 | b1 | b3 | b5 | b7 | |
| | | | | a0 | a2 | a4 | a6 | b0 | b2 | b4 | b6 |
| | | | | a1 | a3 | a5 | a7 | b1 | b3 | b5 | |

MD[7:0] (OESel=1):

| | a1 | a3 | a5 | a7 | b1 | b3 | b5 | b7 | c1 | c3 | c5 |
| | a0 | a2 | a4 | a6 | b0 | b2 | b4 | b6 | c0 | c2 | c4 |
| | | a1 | a3 | a5 | a7 | b1 | b3 | b5 | b7 | c1 | c3 |
| | | a0 | a2 | a4 | a6 | b0 | b2 | b4 | b6 | c0 | c2 |
| | | | a1 | a3 | a5 | a7 | b1 | b3 | b5 | b7 | c1 |
| | | | a0 | a2 | a4 | a6 | b0 | b2 | b4 | b6 | c0 |
| | | | | a1 | a3 | a5 | a7 | b1 | b3 | b5 | b7 |
| | | | | a0 | a2 | a4 | a6 | b0 | b2 | b4 | b6 |

HIGH SPEED PARALLEL LINK RECEIVER

FIELD OF THE INVENTION

This invention generally relates to data transmission links between digital systems, and more particularly to clock recovery at the receiver; circuits, systems, and methods of making.

BACKGROUND OF THE INVENTION

As bandwidth requirements for data transmission systems increase, there is a growing interest in transmitting parallel data at rates previously restricted to serial interfaces. As a consequence, the clock recovery techniques usually used for serial data transmission systems are now becoming relevant to parallel interfaces. In order to ensure the minimum error rate in the received data, each data channel of a parallel interface is provided with its own clock recovery circuit to capture the data. This approach negates the effects of variation in the transmission paths between channels that causes skew between the signals. However, this then produces a set of clocks, one for each channel, each of slightly different phase. These timing differences consequently hinder the use of a single common clock to operate all the receive (RX) channels in synchronism.

Having captured the high-speed serial data signals, it is common practice to demultiplex these into a parallel bus operating at a lower rate in order to alleviate the speed requirements of the subsequent circuitry. If the RX channels for the individual bits are operating independently on separate recovered clocks, this presents further difficulties in obtaining synchronized operation of the demultiplexing circuits. Without synchronization between the channels, it is difficult to sort the data bits from the demultiplexed outputs into the parallel data words originally transmitted.

SUMMARY OF THE INVENTION

The technique described herein presents a means for achieving alignment between the RX demultiplex circuits, thereby achieving alignment of the bits in the data words, while maintaining the use of separate and therefore optimally aligned data recovery clocks for each channel signal.

In general, and in a form of the present invention there is a digital system with circuitry for generating a reference clock signal and clock circuitry for generating a slave clock signal. Phase circuitry is connected to receive the slave clock signal and has outputs for providing a plurality of clock phase signals. A phase selection circuit is connected to receive the plurality of clock phase signals. The phase selection circuit has an output for providing an adjusted clock signal selected from the plurality of clock phase signals in response to a phase selection signal. A clock correlation circuit is connected to receive the reference clock signal and the adjusted clock signal. The clock correlation circuit is operable to determine a phase difference between the reference clock signal and the adjusted clock signal and to provide the phase selection signal such that the phase difference is minimized. The clock correlation circuit comprises a counter and the phase selection signal is a count value output by the counter.

In another embodiment of the present invention, the clock correlation circuit further comprises a plurality of digital to analog converters each with an output connected to a respective input of a first comparator for asserting a decrement signal or a second comparator for asserting an increment signal, wherein each digital to analog converter comprises an exclusive-or gate having an output connected to an integrator, such that an output of the integrator is the output of the digital to analog converter.

In another embodiment, there is a set of clock circuits for generating a set of clock signals each connected to a respective one of a set of phase circuits, thereby to a set of phase selection circuits and thereby to a respective one of a set of clock correlation circuits. Each of the clock circuits is positioned on a substrate in side-by-side manner and each of the clock correlation circuits is connected to minimize a phase difference between the respective clock circuit and a near neighbor clock circuit.

In another embodiment, data channel circuitry is provided with a serial-to-parallel (SP) converter connected to receive a serial data signal. The SP converter has an n-bit output for outputting an n-bit data value selected from the serial data signal in response to the adjusted clock signal. The SP converter has a pair of shift registers of serially connected latches with a first latch connected to receive the serial data signal, each latch being sensitive to an alternate clock level of a half-rate bit clock recovered from the serial data signal by the slave clock circuit. A multiplexer selects the output from one of the shift registers in response to the count value of the counter in the correlation circuit.

BRIEF DESCRIPTION OF THE DRAWINGS

Particular embodiments in accordance with the invention will now be described, by way of example only, and with reference to the accompanying drawings in which like reference signs are used to denote like parts and in which.

Corresponding numerals and symbols in the different figures and tables refer to corresponding parts unless otherwise indicated.

DETAILED DESCRIPTION OF EMBODIMENTS OF THE INVENTION

Aspects of the present invention include methods and apparatus for transferring a single stream of ordered data over a communication channel having a plurality of parallel data links which each may have varying amounts of inherent delay. In the following description, specific information is set forth to provide a thorough understanding of the present invention. Well known circuits and devices are included in block diagram form in order not to complicate the description unnecessarily. Moreover, it will be apparent to one skilled in the art that specific details of these blocks are not required in order to practice the present invention.

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library. The transmission circuits described in detail below can be included within such a digital system in order to transmit data to and from the digital system, for example.

Figure 1A:
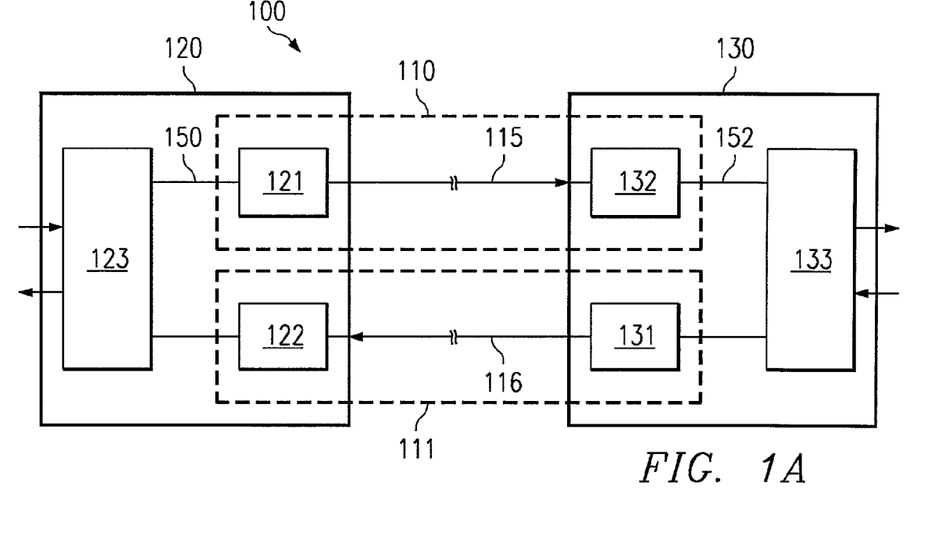
FIG. 1A is a block diagram of a portion of a digital system illustrating a communication channel for transferring data between two nodes of the system, according to aspects of the present invention.

FIG. 1A is a block diagram of a portion of a digital system 100 illustrating a communication channel 110 for transferring data between two nodes (120, 130) of the system, according to aspects of the present invention. A reverse channel 111 is provided for transferring data in the opposite direction to channel 110, and uses a separate physical media. Another embodiment may multiplex bi-directional data on the same physical media. Other embodiments of the present invention may provide differing configuration, such one way transmission without a reverse channel, multiple destination nodes using star or ring topologies, etc.

Node 120 has transmitting circuitry 121, receiving circuitry 122, and processing circuitry 123. Processing circuitry 123 may include a digital signal processor, memory circuits, analog or linear circuits, or any of a wide range of known or novel circuits. Similarly, node 130 has transmitting circuitry 131, receiving circuitry 132, and processing circuitry 133. Physical media 115 connects transmitter 121 to receiver 132, and is twisted pairs of wire in this embodiment. Likewise, physical media 116 connects transmitter 131 to receiver 122.

Due to a need to transfer a large amount of data across communication channel 110, a plurality of data channels are included within channel 110. Three data channels will be considered in the following discussions, but communication channels with a greater number or a fewer number of data channels can be embodied, according to aspects of the present invention. Circuitry within transmitter 121 divides a single stream of ordered word data on bus 150 into a plurality of sub-streams of ordered byte data.

The data channels comprising communication channel 110 transmit each data sub-stream serially, but all the data links transmit in a parallel manner so that all of the data sub-streams are received approximately coincidentally. However, each data channel has an inherent transfer delay time, and the transfer delay time of one link is typically different from the transfer delay time of another channel due to physical differences in the data channels. Therefore, a skew is induced between the various received data sub-streams at receivers 132. According to aspects of the present invention, channel receivers in receiver circuitry 132 compensate for the skew between data links so that circuitry within receiver 132 can combine the plurality of received data streams to form a single received data stream of ordered data on bus 152 which is m-bits wide. This single stream of data can be buffered in response to a common word clock before being sent to processing circuitry 133.

In one embodiment, one of the channels is designated as a master link, and all of the other channels are designated as slave links. During operation, the slave links are synchronized to the master link by synchronizing circuitry in each receiver that will be described now in further detail.

Figure 1B:
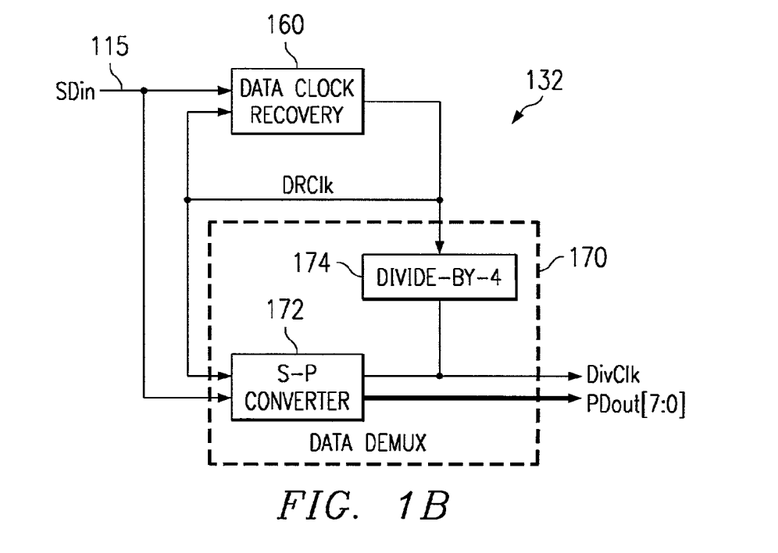
FIG. 1B is a block diagram of a common architecture for a single RX channel.

FIG. 1B is a block diagram of a common architecture for a single RX channel in receiver circuitry 132. Serial data received on data signal line 115 is first used to generate a data recovery clock, DRClk, whose phase is controlled by the Data Clock Recovery circuit 160 so as to be optimally aligned to synchronously capture the data in data demultiplexing circuit 170. Within demux circuit 170, a serial-parallel (S-P) converter 172 captures the data provided on data signal 115 in response to data recovery clock DRClk. S-P circuit 172 provides the captured data in a parallel format on an 8-bit parallel bus Pdout[7:0] for use by the digital system in response to a divided clock signal DivClk produced by divide-by-four circuit 174. Converting the serial data stream to a parallel data stream allows it to be distributed in the digital system at a lower transfer rate.

There are known techniques for the means used to generate the recovery clock, so clock recovery circuit 160 will not be described in detail herein; however, in order to achieve the maximum possible data rate, the system operates using a half-rate recovery clock, i.e. a clock with only one transition in every serial data bit period. This requires the data to be captured on both positive and negative clock edges. In this embodiment, an 8:1 demultiplex ratio is being used with a 4:1 clock division; however, the technique is amenable to other ratio values with appropriate minor circuit modifications.

Figure 2:
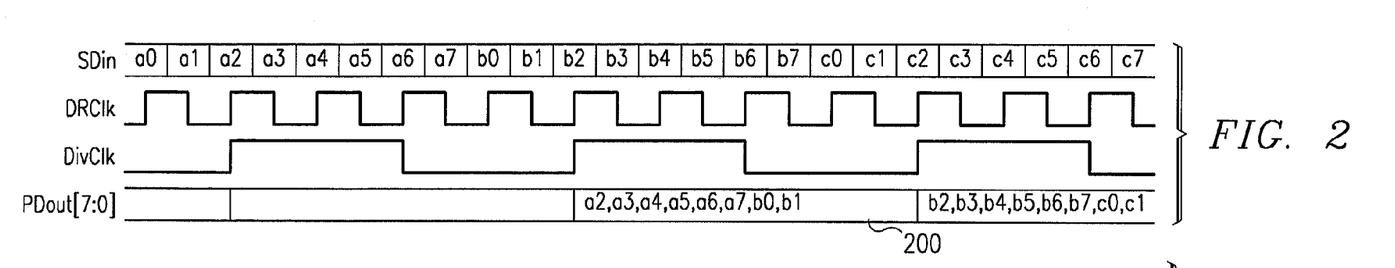
FIG. 2 is a timing diagram illustrating operation of the single RX channel of FIG. 1.

FIG. 2 is a timing diagram illustrating operation of the single RX channel of FIG. 1A. The DRClk captures data on both its positive and negative edges. These data bits are then parallelized into an 8-bit word by the serial-parallel converter. For this channel, the grouping of bits output in the parallel data depends simply on the latency of the data path, which is generally fixed, and the relationship between the data stream and divided clock which is random. For example, as shown an 200, the bits placed on output bus Pdout[7:0] happen to be ordered beginning with bit a2, where "a, b, c, . . . " indicates a byte order and "2" indicates a bit position within the byte.

Figure 3:
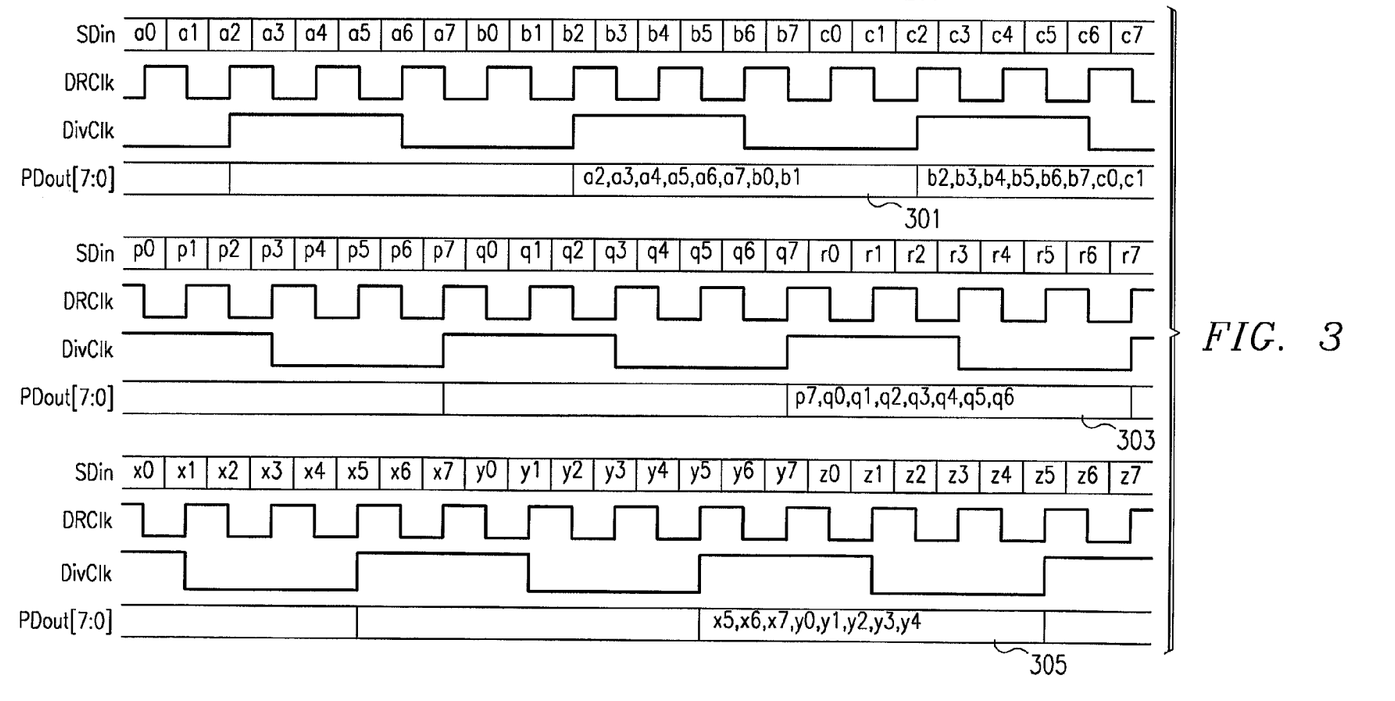
FIG. 3 is a timing diagram illustrating operation of a three-channel RX interface with random alignment.

FIG. 3 is a timing diagram illustrating operation of a three-channel RX interface with random alignment. The RX architecture shown in FIG. 2 is quite adequate for use as a single channel serial interface. For a parallel link, however, since there is no control over the clock divider alignment, the positions of the bits in the parallel data output will be completely random, thus hindering the recombination of the demultiplexed data back into a bit-order sent by the data interface transmitter (TX). As mentioned above, for any channel, the grouping of bits output in the parallel data depends simply on the fixed latency of the datapath and the random relationship between the data stream and divided clock. Thus, in this example, a random result produces bit octets beginning with bit 2 on the first channel at 301, octets beginning with bit 7 on the second channel at 303, and octets beginning with bit 5 on the third channel at 305. Of course, these results will vary randomly each time the system is started.

Figure 4:
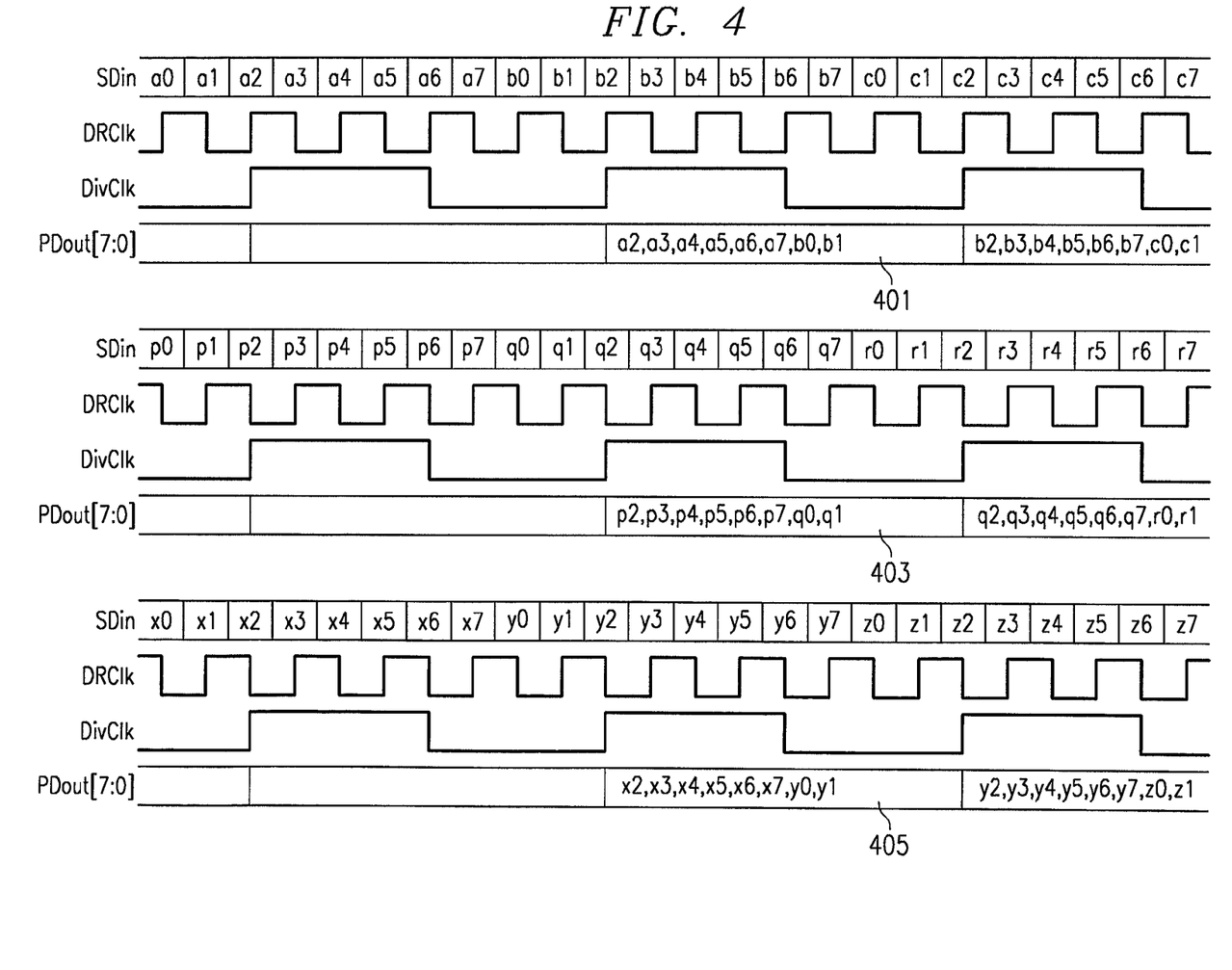
FIG. 4 is a timing diagram illustrating operation of a three-channel RX interface in alignment.

FIG. 4 is a timing diagram illustrating operation of a three-channel RX interface in alignment, in which the divided clocks are brought into alignment as indicated at 401, 403, 405 such that octets beginning with bit 2 are captured and output on each channel. Therefore, the grouping of bits in the parallel data outputs is also aligned between channels. Note that this "channel alignment" is not strictly equivalent to "word alignment" as in a serial data system, inasmuch as there is no alignment to a specific group of 8-bits; only that all the channels are in the same alignment. However, this is sufficient to reconstruct the parallel words sent by the TX. Note that because this is a half-rate system, the DRClk's do not necessarily have the same polarity between channels. Also, in practice, the channels will be slightly misaligned due to skew between the serial data streams. As long as this skew is less than ½ bit period, however, it should be possible to achieve effective channel alignment by setting the divided clocks to their most closely aligned value.

Once alignment is achieved, it is straightforward to synchronously transfer all the parallel data buses into a single clock regime, such as by using the falling edge of one of the DivClk's, with no significant impact of the skew on the serial inputs.

In another embodiment, the receiver circuitry can perform word alignment by using frame detection or other known synchronization techniques to byte-align the master channel. Once the master channel is byte-aligned, the other channels will also be byte-aligned. Similarly, each channel could be word-aligned in an individual manner using frame detection, or other known means.

Figure 5:
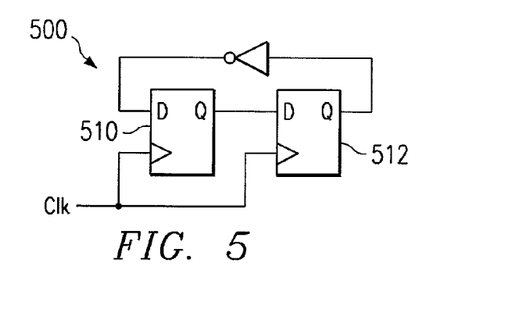
FIG. 5 is a basic two stage twisted ring counter for use in a divide-by-four circuit.

FIG. 5 is a basic two-stage twisted ring counter 500 for use in a divide-by-four circuit. As discussed above, an aspect of the present invention relies on the ability to shift the divided-by-4 clock timing. As can be seen from FIG. 3 and FIG. 4, the phase timing of the adjusted clock DivClk must be altered in steps corresponding to one bit-period, referred to as 1-UI. Since this is a half-rate system, the output of the clock divider must be selectable in 1 UI steps, which is equivalent to a half-cycle of the recovered clock DRClk used to drive the divide-by-4 counter. Divide-by-4 counter 500 is based on a two-stage 510, 512 twisted ring counter. This is a very amenable design for high speed operation since it has a minimum of logic, nominally equal loads on the latches and no illegal states.

Figure 6:
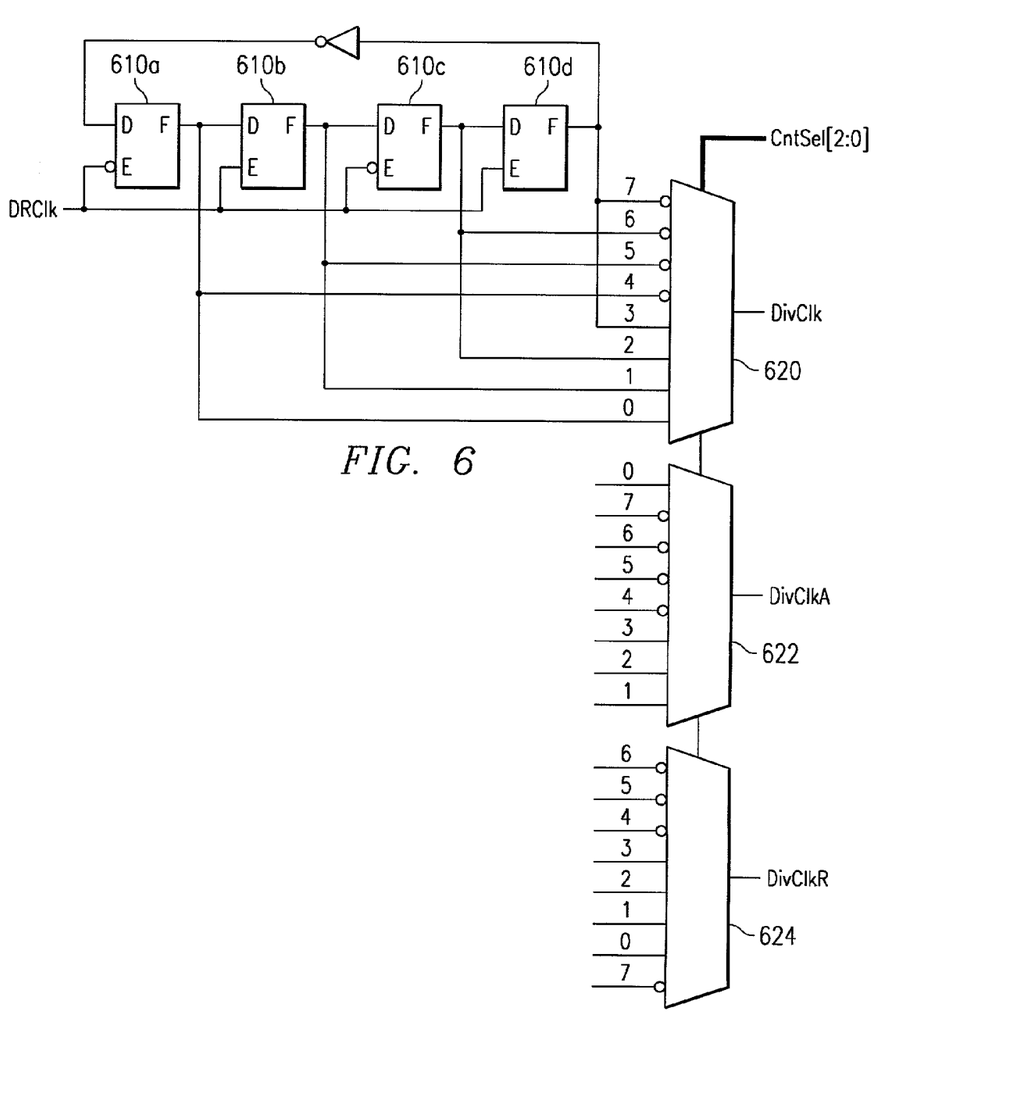
FIG. 6 is a schematic of the divide-by-four circuit of FIG. 5 with a selectable half-cycle output resolution.

FIG. 6 is a schematic of the divide-by-four circuit of FIG. 5 with a selectable half-cycle output resolution. Rather than trying to achieve half-clock cycle resolution by trying to invert the clock signal, which could then cause erratic behavior due to glitches as the clock is flipped, the latches in divide-by 4 counter 600 are instead split into the master/slave half-latches 610a, 610b, 612a, and 612b. This is straightforward since a master/slave flip-flop is generally comprised of two latches. All eight divided clock phases can then be output simply by selecting the appropriate half-latch output or its inverse via an 8:1 multiplexer 620 using a phase selection signal CntSel[2:0]. This approach also completely avoids the difficulty of trying to directly alter the count value itself.

This, divide-by-4 counter 600 operates as a phase circuit to receive the DRClk signal and provide eight phases corresponding to eight bit positions of the received data stream. Multiplexer 600 operates as a phase selection circuit that provides an adjusted clock signal selected from the plurality of clock phase signals in response to a phase selection signal.

An additional multiplexer 622 also receives all eight phases, but the inputs are shifted by one position so that for a given phase selection signal CntSel[2:0], multiplexer 622 selects an advanced clock phase signal DivClkA that leads clock signal DivClk by one bit period.

Another multiplexer 624 also receives all eight phases, but the inputs are shifted by one position opposite from 622 so that for a given phase selection signal CntSel[2:0], multiplexer 624 selects a retarded clock phase signal DivClkR that lags clock signal DivClk by one bit period.

Figure 7:
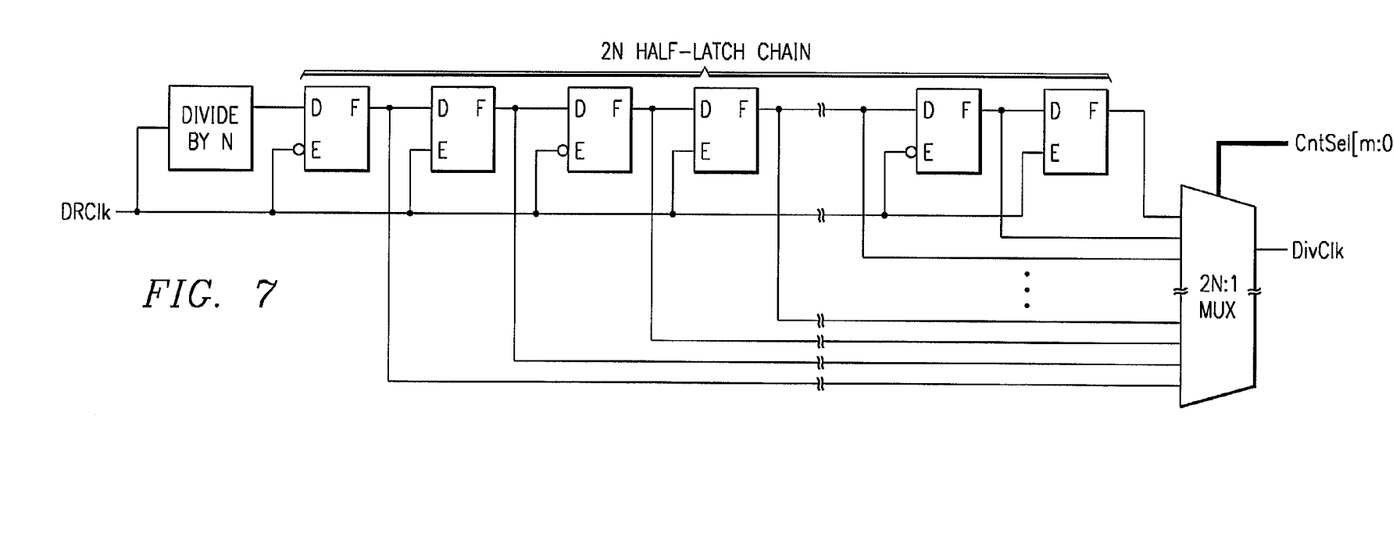
FIG. 7 is a schematic of an alternative means for providing half-cycle resolution in a divide-by-n circuit.

FIG. 7 is a schematic of an alternative means for providing half-cycle resolution in a divide-by-n circuit. This again uses the outputs of master/slave half-latches to achieve half-cycle resolution, but this time these implement a selectable delay line external to the counter itself. In other embodiments, various types of divide-by-n counters may be used in conjunction such a delay line.

Figure 8:
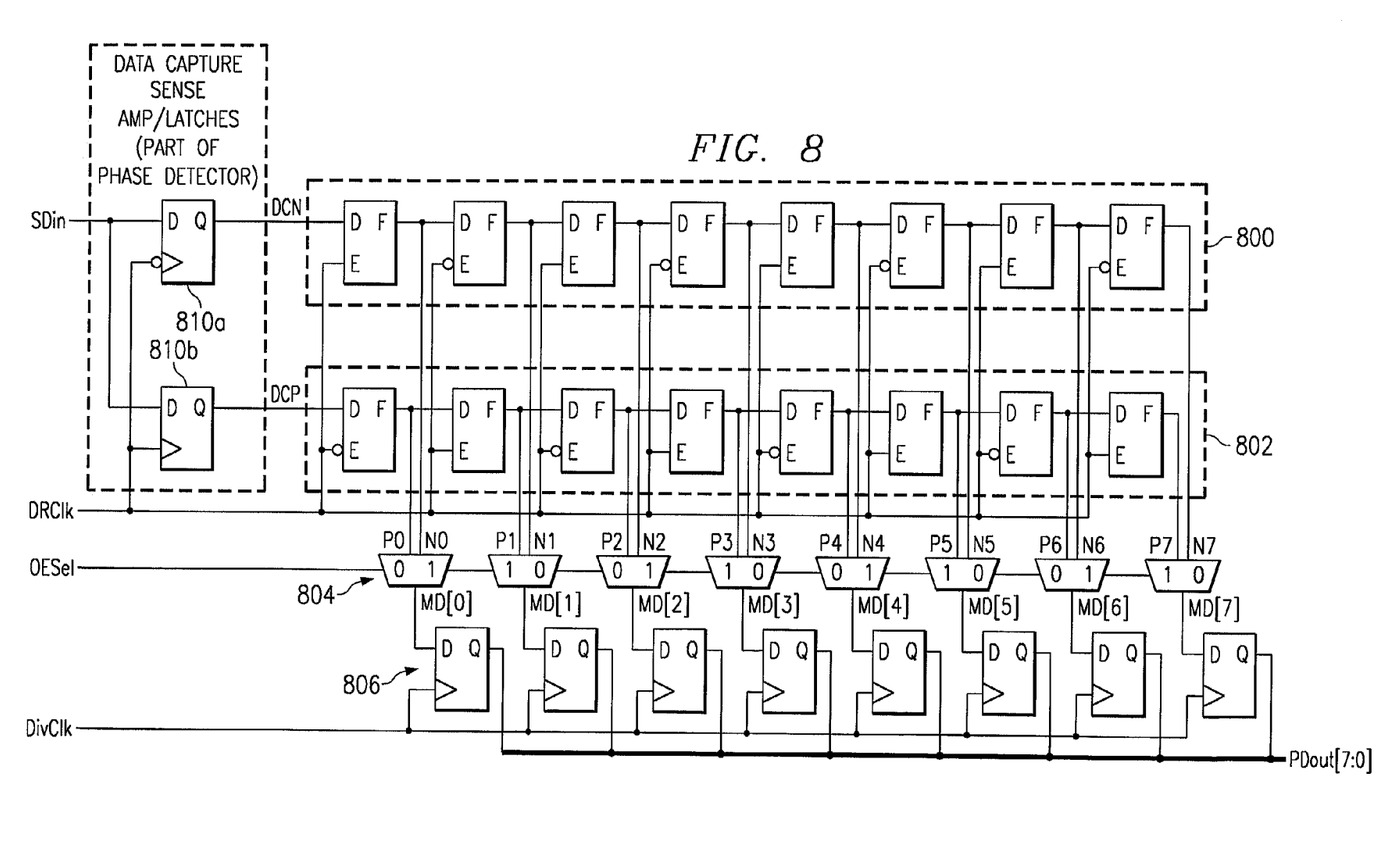
FIG. 8 is a serial-parallel converter for use with a half-rate recovered clock and with the selectable divided clock of FIG. 6 or FIG. 7.

FIG. 8 is a serial-parallel converter for use with a half-rate recovered clock and with the selectable divided clock of FIG. 6 or FIG. 7. The simplest approach for implementing a serial-parallel converter is the use of a serial shift register for the incoming data, in tandem with a parallel load register clocked on the DivClk rising edge. However, this is again complicated by the use of the half-rate recovery clock.

The solution to this involves splitting the serial shift register latches into their component halves in a pair of shift registers 800, 802 that each receive only every other bit of the bit stream from sense amp latches 810 that are respectively clocked by opposite edges of recovered clock DRClk. Shift register 800 has eight serially connected latches, 800 [7:0] with latch 800.0 connected to receive every other bit of the serial data signal from sense amp latch 810a. Each latch in the chain is sensitive to an alternate clock level of half-rate bit clock DRClk. Similarly, shift register 802 has eight serially connected latches, 802[7:0] with latch 802.0 connected to receive every other bit of the serial data signal from sense amp latch 810b. Each latch in the chain is sensitive to an alternate clock level of half-rate bit clock DRClk, such that latch 802.0 of the second shift register is sensitive to an opposite clock level from the latch 800.0 of the first shift register.

The appropriate half-latch outputs are selected for transfer into the output register via a set of 2:1 muxes 804 under control of the OESel signal that toggles to indicate whether an odd or even DivClk phase has been selected from the divide-by-4 counter. OESel is equivalent to the LSB of CntSel in FIG. 5. OESel thus selects the outputs of either the high-enabled or the low-enabled latches for the parallel output register.

Figure 9A:
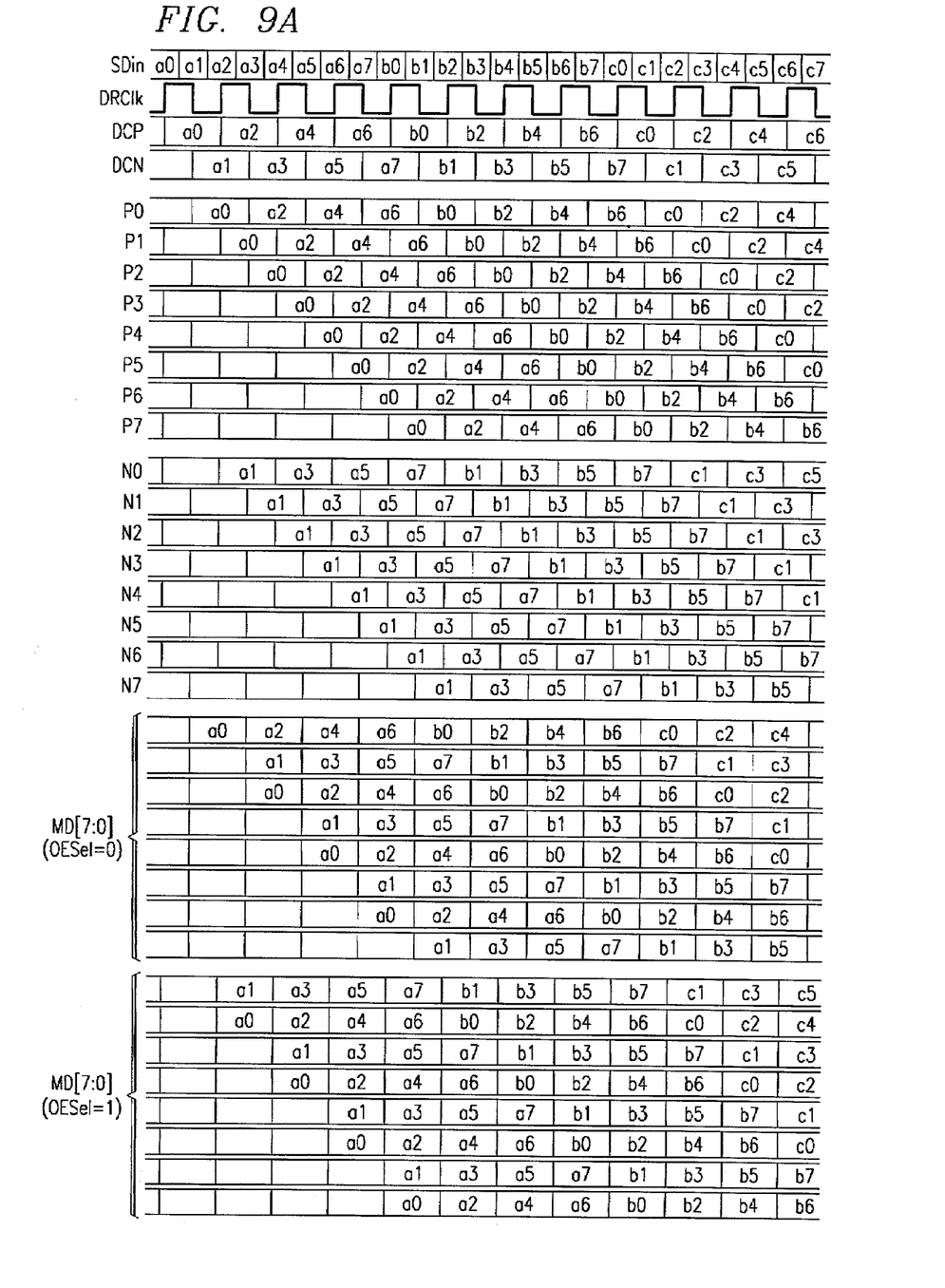
FIG. 9A is a is timing diagram illustrating operation of the serial shift registers and mux of FIG. 8.
Figure 9B:
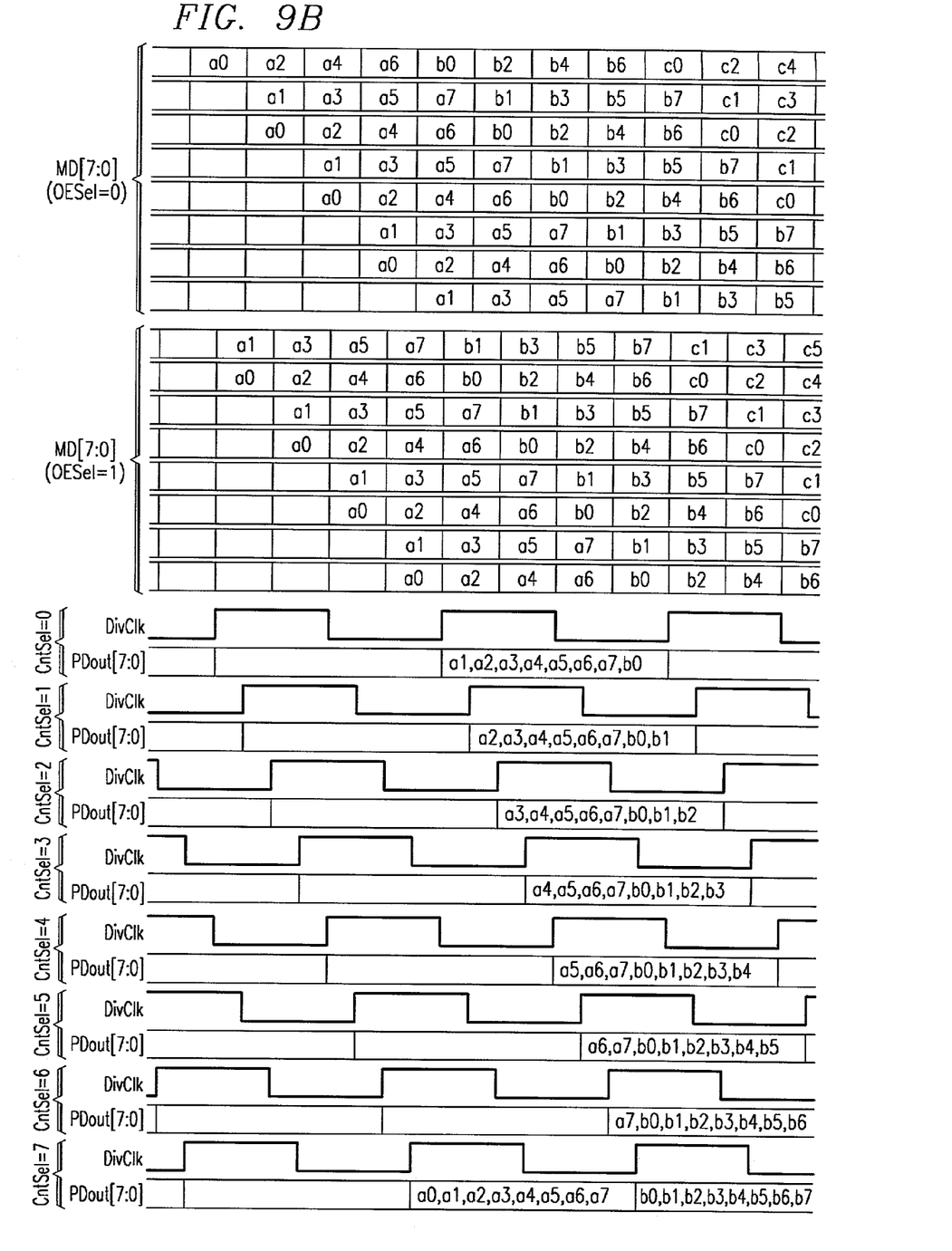
FIG. 9B a is timing diagram illustrating operation of the mux and output register of FIG. 8 for different select values.

FIG. 9A is a is timing diagram illustrating operation of the serial shift registers and mux of FIG. 8. FIG. 9B is a timing diagram illustrating operation of the mux and output register of FIG. 8 for different values of phase selection signal CntSel{2:0}. The circuit can easily be adapted to higher demultiplex ratios simply by extending the register lengths appropriately.

Figure 10:
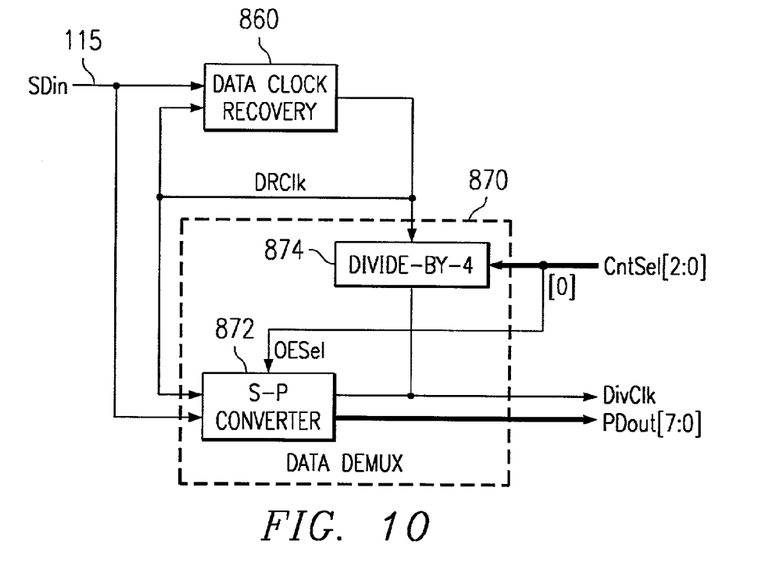
FIG. 10 is a block diagram of a receiver similar to FIG. 1 with provision for channel alignment.

FIG. 10 is a block diagram of a receiver similar to FIG. 1 with provision for channel alignment. Divide-by-4 clock circuit 874 is the same as FIG. 6 and is controlled by phase selection signal CntSel[2:0]. S-P converter 872 is the same as FIG. 8 and is controlled by select signal OESel, which is bit 0 of CntSel[2:0]. In order to control this alignment, divided clock signal DivClk for each channel needs to be compared with that of the other channels and adjusted via the CntSel control signal accordingly, as will now be described.

Figure 11A:
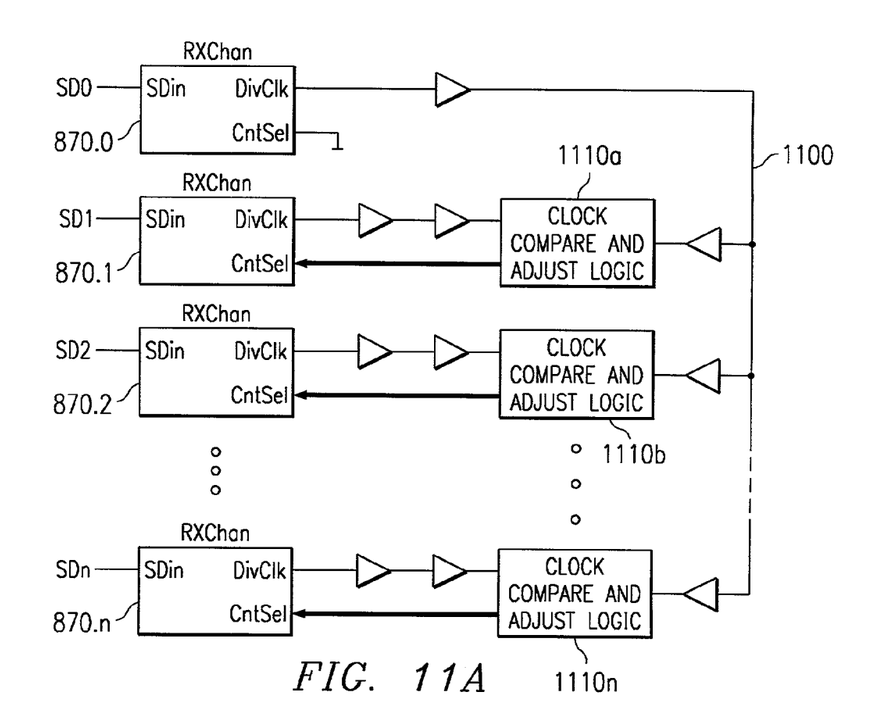
FIG. 11A is a block diagram illustrating a set of receiver channels with global alignment.
Figure 11B:
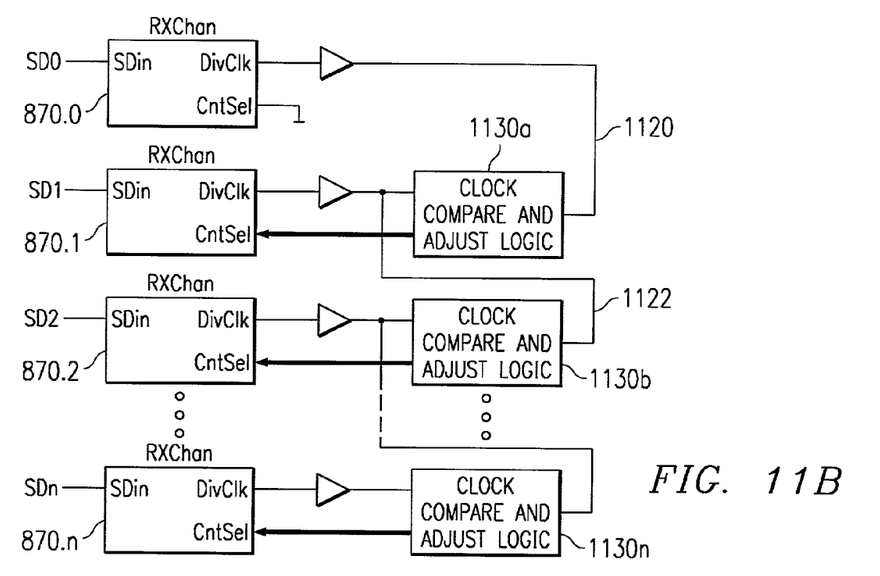
FIG. 11B is a block diagram illustrating a set of receiver channels with relative alignment.

FIG. 11A is a block diagram illustrating a set of receiver channels with global alignment, while FIG. 11B is a block diagram illustrating a set of receiver channels with relative alignment. In both cases, one channel will be assigned the master channel and will have a fixed DivClk phase selected.

For the global alignment scheme, clock 1100 output from the master channel 870.0 is distributed to a clock comparison block 1100a–n linked to each of the other channels, such as 870.1. This reference clock needs to be distributed with a minimum of skew to avoid degradation of data input skew tolerance. Also, the clocks from the local channel to the clock comparison blocks need to have a delay matched to that of the master clock.

In the relative alignment scheme, the DivClk for each channel is simply compared with that of its neighbor. This assumes that the channels are positioned on a substrate in side-by-side manner or some other ordered manner and each of the clock correlation circuits is connected to minimize a phase difference between the respective clock circuit and a near neighbor clock circuit. For example, channel 870.1 is compared to clock signal 1120 of channel 870.0 in correlation circuit 1130a, while channel 870.2 is compared to clock signal 1122 of channel 870.1 in correlation circuit 1130b. This makes the distribution of clocks far easier and is therefore the generally preferred option. However, the complete system will take longer to achieve full alignment since the channels will settle sequentially rather than in parallel.

Figure 12:
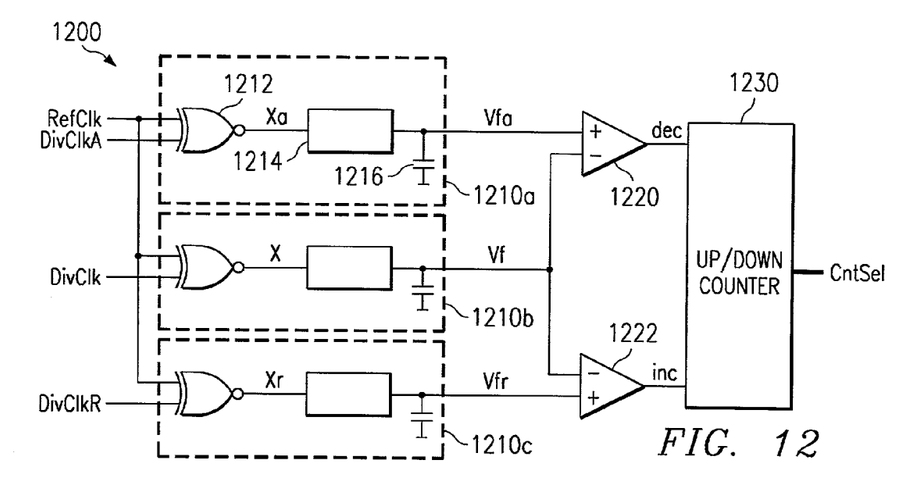
FIG. 12 is a schematic of a clock correlation circuit using a counter for the receiver of FIG. 10.

FIG. 12 is a schematic of a clock correlation circuit using a counter for the receiver of FIG. 10. Standard phase detection techniques are not applicable to this situation since these generally just indicate which of two signals is advanced relative to the other. In this case, it is necessary to detect from a choice of possible clock phases that which is closest to the reference. According to an aspect of the present invention, a means for doing this is to use a clock correlation circuit. The clock correlation circuit is connected to receive the reference clock signal and the adjusted clock signal and is operable to determine a phase difference between the reference clock signal and the adjusted clock signal and to provide the phase selection signal such that the phase difference is minimized.

In order to detect the optimum clock phase, multiple phases of the DivClk are provided from the divide-by-4 phase circuit. The extra clock phases are obtained from the divider simply by adding extra 8:1 muxes with the clock phase taps shifted appropriately. Selector 620 provides a currently selected clock phase signal, selector 622 provides a clock phase signal DivClkA advanced by one phase and selector 624 provides a clock phase signal DivClkR retarded by one phase, as described earlier. The correlation circuit then tests the relative alignment of the various phases against the reference signal.

Since the clocks are coming straight from dividers and will therefore have well defined mark-space ratios, a simple logic circuit is used as analog-to-digital (A/D) converters 1210a–c to derive a voltage conveying the degree of alignment. This embodiment compares the reference clock phase with three phases of the local DivClk. DivClkA and DivClkR are output from the divide-by-4 counter and are one UI (half-DRClk cycle) advanced and retarded from DivClk, respectively. Each A/D is similar; in A/D 1210a EXNOR gate 1212 outputs a high level whenever its input signals are equal. The output is connected to an integrator that filters the output signal and provides a voltage that is a measure of how much the EXNOR inputs overlap. Resistor 1214 and capacitor 1216 comprise the integrator.

The voltages from the three A/D circuits are then compared using an analog comparator to determine whether optimum phase alignment has been achieved. Voltage Vfa indicates a measure of overlap between advanced clock phase DivClkA and the reference clock. Voltage Vf indicates a measure of overlap between clock phase DivClk and the reference clock. Voltage Vfr indicates a measure of overlap between retarded clock phase DivClkR and the reference clock. When the voltage on Vfa exceeds voltage Vf a decrement signal is asserted by comparator 1220 that is connected to up/down counter 1230. Similarly, when the voltage on Vfr exceeds voltage Vf an increment signal is asserted by comparator 1222 that is connected to up/down counter 1230. Only when the voltage on Vf exceeds both Vfa and Vfr will the circuit settle, and this corresponds to the situation where DivClk is more closely aligned to the reference than either DivClkA or DivClkR.

Figure 13:
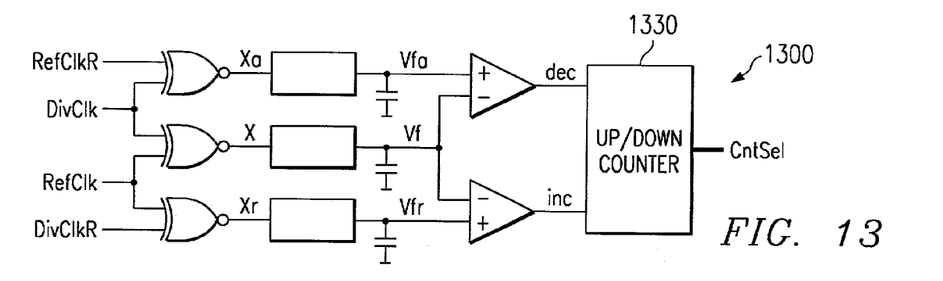
FIG. 13 is a variation of the correlation circuit of FIG. 12.

FIG. 13 is a variation of the correlation circuit of FIG. 12. This is equivalent in its function but compares two reference clock phases with two local DivClk phases, rather than one reference and three DivClk phases. In this case, an additional selector mux is included within the reference clock circuitry to provide the reference clock phase signal, in a similar manner to FIG. 6, for example. In this embodiment, Voltage Vfa indicates a measure of overlap between clock phase DivClk and a retarded reference clock phase RefClkR. Voltage Vf indicates a measure of overlap between clock phase DivClk and the reference clock RefClk. Voltage Vfr indicates a measure of overlap between retarded clock phase DivClkR and the reference clock. This embodiment is better balanced and more efficient in that only two selector muxes are needed in each divide-by-4 circuit. However, for the global clock alignment scheme this embodiment requires two reference clock phases to be globally distributed.

Figure 14:
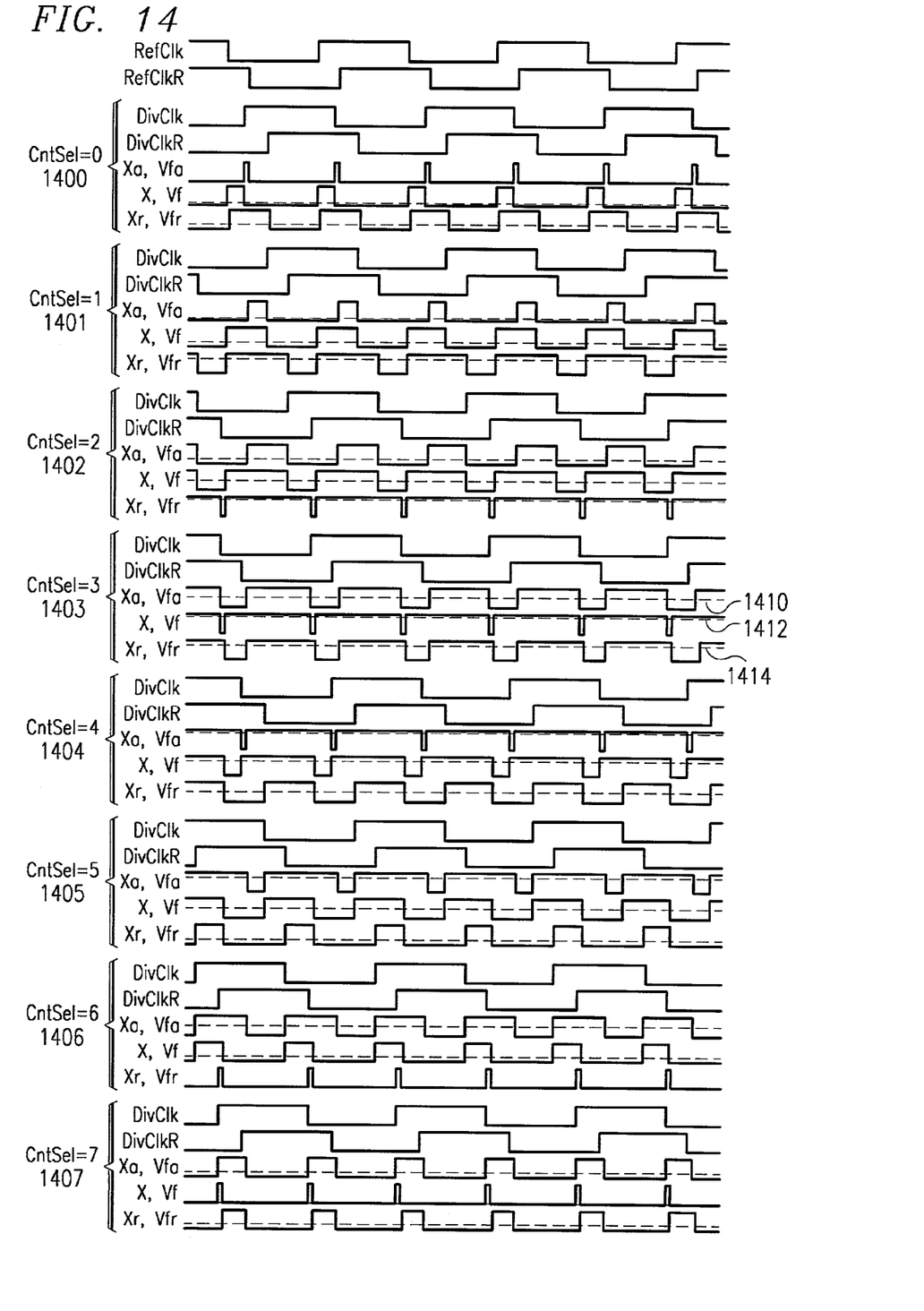
FIG. 14 is a timing diagram illustrating operation of the clock correlation circuit of FIG. 13

FIG. 14 is a timing diagram illustrating operation of the clock correlation circuit of FIG. 13. This figure illustrates all eight possible values of phase selection signal CntSel, ranging from a value of zero to a value of seven and resultant selected clock phase signals, indicated at 1400–1407, respectively. For each CntSel value, dotted lines indicate an approximate voltage level for each of voltages Vfa, Vf and Vfr, as indicated by 1410, 1412 and 1414 respectively. In this example, a CntSel value of three indicated at 1403 gives the optimum alignment between DivClk and RefClk. Note that Vf 1402 is higher than both Vfa 1400 and Vfr 1404. Thus, counter 1330 stops counting and correlation circuit 1300 is settled.

In either embodiment above, the Up/Down counter should give precedence to either increment or decrement and should not remain static if asked to do both. After any change of CntSel, the A/D circuits should be given time to resettle before allowing any further changes of the counter.

Thus, a technique has been described for implementing a serial data RX and demultiplexer which can be controlled so as to be brought into alignment with other RX channels thus allowing its application for parallel data links. A clock correlation technique has been proposed to compare the divided clocks between channels and adjust the demultiplexer accordingly to achieve optimum alignment. In this way, providing the skew between the data inputs of the RX channels does not exceed ½ UI, the parallel data can be reconstituted by combining the corresponding bits of the demultiplexed data outputs.

Fabrication of digital system nodes 120, 130 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice that may be sold as bare die or packaged. After packaging, finished parts are biased into an operational state and tested for operational functionality.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. For example, the present invention is applicable to various physical media, such as wire cables, optical cables, laser optic links, infrared links, radio or microwave links, backplanes, etc.

Each channel can use single ended signaling or differential signaling, for example.

Another aspect of the present invention is that the single stream of ordered word data can be divided into a plurality of data sub-streams using different techniques on different embodiments. For example, in the described embodiment each word of the data stream was divided into bytes with a bit length equal to the data path width of each data link. In another embodiment, a pre-selected number of words may be grouped as a single item and then divided into bytes with a bit length equal to the data path width of each data link. In another embodiment, a first portion of a word may be divided into bytes with a bit length equal to the data path width of each data link, and then a second portion of the same word may be divided into bytes, etc. Other schemes for dividing a single stream of data into multiple sub-streams are included within the scope of the present invention.

Another embodiment of the invention may use other types of filter circuits for the integrators in the correlation circuits. Similarly, other types of A/D circuits may be used to provide a measure of the overlap of each slave clock phase and corresponding reference clock phase.

An alternative embodiment of the novel aspects of the present invention may include other circuitries which are combined with the circuitries disclosed herein in order to reduce the total gate count of the combined functions. Since those skilled in the art are aware of techniques for gate minimization, the details of such an embodiment will not be described herein.

It is therefore contemplated that the appended claims will cover any such modifications of the embodiments as fall within the true scope and spirit of the invention.

What is claimed is:

1. A digital system comprising:
   circuitry for generating a reference clock signal;
   clock circuitry for generating a clock signal;
   phase circuitry connected to receive the clock signal and having outputs for providing a plurality of clock phase signals;
   a phase selection circuit, connected to receive the plurality of clock phase signals, the phase selection circuit having an output for providing an adjusted clock signal selected from the plurality of clock phase signals in response to a phase selection signal;
   a clock correlation circuit connected to receive the reference clock signal and the adjusted clock signal, the clock correlation circuit operable to determine a phase difference between the reference clock signal and the adjusted clock signal and to provide the phase selection signal such that the phase difference is minimized, wherein the clock correlation circuit includes
   a counter and the phase selection signal s a count value output by the counter,
   a first comparator connected to the counter for asserting a decrement signal if a first input of the first comparator is at a higher potential than a second input of the first comparator,
   a second comparator connected to the counter for asserting an increment signal if a first input of the second comparator is at a higher potential than a second input of the second comparator,
   a first digital to analog converter with an output connected to the second input of the first comparator and to the second input of the second comparator for generating a voltage that is correlated with the phase difference between the reference clock signal and the adjusted clock signal;
   a second digital to analog converter with an output connected to the first input of the first comparator for generating a voltage that is correlated with a phase difference between the reference clock signal and a first selected one of the plurality of clock phase signals that leads the adjusted clock signal by a defined phase amount; and
   a third digital to analog converter with an output connected to the first input of the second comparator for generating a voltage that is correlated with a phase difference between the reference clock signal and a second selected one of the plurality of clock phase signals that lags the adjusted clock signal by a defined phase amount.

2. The digital system of claim 1, wherein the clock correlation circuit further comprises a plurality of digital to analog converters each with an output connected to a respective input of the first comparator or the second comparator, wherein each digital to analog converter comprises an exclusive-or gate having an output connected to an integrator, such that an output of the integrator is the output of the digital to analog converter.

3. The digital system of claim 2, wherein the integrator is a resistor-capacitor network.

4. The digital system of claim 1, further comprising:
   a plurality of clock circuits for generating a plurality of clock signals each connected to a respective one of a plurality of phase circuits, thereby to a plurality of phase selection circuits and thereby to a respective one of a plurality of clock correlation circuits; and
   wherein each of the plurality of clock circuits is positioned on a substrate in ordered manner and each of the plurality of clock correlation circuits is connected to minimize a phase difference between the respective clock circuit and a near neighbor clock circuit.

5. The digital system of claim 1, further comprising a data channel circuit with an input for receiving a serial data signal, wherein the clock circuit is connected to the data channel circuit and is operable to generate the clock signal by recovering a half-rate bit clock signal from the serial data signal.

6. The digital system of claim 5, wherein the data channel circuit comprises a serial-to-parallel (SP) converter connected to receive the serial data signal, the SP converter having an n-bit output for outputting an n-bit data value selected from the serial data signal in response to the adjusted clock signal, the SP converter comprising:
   a first shift register of serially connected latches with a first latch connected to receive every other bit of the serial data signal, each latch being sensitive to an alternate clock level of the half-rate bit clock;
   a second shift register of serially connected latches with a first latch connected to receive an opposite every other bit of the serial data signal, each latch being sensitive to an alternate clock level of the half-rate bit clock, such that a first latch of the second shift register is sensitive to an opposite clock level from the first latch of the first shift register; and
   an n-bit two-input multiplexer, each bit of the multiplexer having a first input connected to an output of a respective latch in the first shift register and a second input connected to an output of a respective latch in the second shift register, the multiplexer having a select input connected to receive one bit of the count value from the counter.

7. The digital system of claim 6, wherein the SP converter further comprising an n-bit register that provides the n-bit output connected to receive respective outputs from the n-bit multiplexer, the n-bit register having a clock input connected to receive the adjusted clock signal.

8. A digital system comprising:
   circuitry for generating a reference clock signal;
   clock circuitry for generating a clock signal;
   phase circuitry connected to receive the clock signal and having outputs for providing a plurality of clock phase signals;
   a phase selection circuit, connected to receive the plurality of clock phase signals, the phase selection circuit having an output for providing an adjusted clock signal selected from the plurality of clock phase signals in response to a phase selection signal;
   a clock correlation circuit connected to receive the reference clock signal and the adjusted clock signal, the clock correlation circuit operable to determine a phase difference between the reference clock signal and the adjusted clock signal and to provide the phase selection signal such that the phase difference is minimized, wherein the clock correlation circuit includes
   a counter and the phase selection signal sa count value output by the counter,
   a first comparator connected to the counter for asserting a decrement signal if a first input of the first comparator is at a higher potential than a second input of the first comparator,
   a second comparator connected to the counter for asserting an increment signal if a first input of the second comparator is at a higher potential than a second input of the second comparator,
   a first digital to analog converter with an output connected to the second input of the first comparator and to the second input of the second comparator for generating a voltage that is correlated with the phase difference between the reference clock signal and the adjusted clock signal,
   a second digital to analog converter with an output connected to the first input of the second comparator for generating a voltage that is correlated with a phase difference between the reference clock signal and a first selected one of the plurality of clock phase signals that lags the adjusted clock signal by a defined phase amount, and
   a third digital to analog converter with an output connected to the first input of the first comparator for generating a voltage that is correlated with a phase difference between the adjusted clock signal and a reference clock phase signal that lags the reference clock signal by a defined phase amount.

9. A digital system comprising:
   circuitry for generating a reference clock signal;
   clock circuitry for generating a clock signal;
   phase circuitry connected to receive the clock signal and having outputs for providing a plurality of clock phase signals;
   a phase selection circuit, connected to receive the plurality of clock phase signals, the phase selection circuit having an output for providing an adjusted clock signal selected from the plurality of clock phase signals in response to a phase selection signal;
   a clock correlation circuit connected to receive the reference clock signal and the adjusted clock signal, the clock correlation circuit operable to determine a phase difference between the reference clock signal and the adjusted clock signal and to provide the phase selection signal such that the phase difference is minimized;
   wherein the clock correlation circuit comprises a counter and the phase selection signal is a count value output by the counter; and
   a data channel circuit with an input for receiving a serial data signal, wherein the clock circuit is connected to the data channel circuit and is operable to generate the clock signal by recovering a half-rate bit clock signal from the serial data signal, the data channel circuit including a serial-to-parallel (SP) converter connected to receive the serial data signal, the SP converter having an n-bit Output for outputting an n-bit data value selected from the serial data signal in response to the adjusted clock signal, the SP converter including:
   a first shift register of serially connected latches with a first latch connected to receive every other bit of the serial data signal, each latch being sensitive to an alternate clock level of the half-rate bit clock,
   a second shift register of serially connected latches with a first latch connected to receive an opposite every other bit of the serial data signal, each latch being sensitive to an alternate clock level of the half-rate bit clock, such that a first latch of the second shift register is sensitive to an opposite clock level from the first latch of the first shift register, and
   an n-bit two-input multiplexer, each bit of the multiplexer having a first input connected to an output of a respective latch in the first shift register and a second input connected to an output of a respective latch in the second shift register, the multiplexer having a select input connected to receive one bit of the count value from the counter.

10. The digital system of claim 9, wherein the clock correlation circuit further comprises:
  a first comparator connected to the counter for asserting a decrement signal if a first input of the first comparator is at a higher potential than a second input of the first comparator; and
  a second comparator connected to the counter for asserting an increment signal if a first input of the second comparator is at a higher potential than a second input of the second comparator.

11. The digital system of claim 10, wherein the clock correlation circuit further comprises a plurality of digital to analog converters each with an output connected to a respective input of the first comparator or the second comparator, wherein each digital to analog converter comprises an exclusive-or gate having an output connected to an integrator, such that an output of the integrator is the output of the digital to analog converter.

12. The digital system of claim 11, wherein the integrator is a resistor-capacitor network.

13. The digital system of claim 9, further comprising:
  a plurality of clock circuits for generating a plurality of clock signals each connected to a respective one of a plurality of phase circuits, thereby to a plurality of phase selection circuits and thereby to a respective one of a plurality of clock correlation circuits; and
  wherein each of the plurality of clock circuits is positioned on a substrate in ordered manner and each of the plurality of clock correlation circuits is connected to minimize a phase difference between the respective clock circuit and a near neighbor clock circuit.

14. The digital system of claim 9, wherein the SP converter further comprising an n-bit register that provides the n-bit output connected to receive respective outputs from the n-bit multiplexer, the n-bit register having a clock input connected to receive the adjusted clock signal.

* * * * *